(12) United States Patent
Suehiro (10) Patent No.: US 7,804,520 B2
(45) Date of Patent: Sep. 28, 2010

(54) IMAGE SENDING AND RECEIVING SYSTEM, IMAGE SENDING APPARATUS AND IMAGE RECEIVING APPARATUS

(75) Inventor: Masako Suehiro, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1188 days.

(21) Appl. No.: 10/699,774

(22) Filed: Nov. 4, 2003

(65) Prior Publication Data

US 2004/0090543 A1 May 13, 2004

(30) Foreign Application Priority Data

Nov. 5, 2002 (JP) ............................. 2002-321046

(51) Int. Cl.
*H04N 5/225* (2006.01)
(52) U.S. Cl. .............................. 348/207.11; 348/207.2
(58) Field of Classification Search .............. 348/207.2, 348/231.2, 231.6, 231.9, 207.1, 207.11
See application file for complete search history.

(56) References Cited

U.S. PATENT DOCUMENTS

| | | | | | |
|---|---|---|---|---|---|
| 5,357,347 | A | * | 10/1994 | Hirose et al. | ................. 358/296 |
| 5,778,053 | A | * | 7/1998 | Skarbo et al. | ............. 379/93.21 |
| 6,577,338 | B1 | * | 6/2003 | Tanaka et al. | ............. 348/207.2 |
| 6,819,355 | B1 | * | 11/2004 | Niikawa | ................. 348/207.11 |
| 6,867,882 | B1 | * | 3/2005 | Takahashi | .................... 358/1.6 |
| 6,950,125 | B1 | * | 9/2005 | Sato | ......................... 348/207.2 |
| 7,027,172 | B1 | * | 4/2006 | Parulski et al. | ............. 358/1.15 |
| 7,107,516 | B1 | * | 9/2006 | Anderson et al. | ........... 715/210 |
| 2002/0178304 | A1 | * | 11/2002 | Camara et al. | ................. 710/11 |
| 2003/0085988 | A1 | * | 5/2003 | Fujiwara | .................... 348/14.1 |
| 2004/0201680 | A1 | * | 10/2004 | Gennetten et al. | ........ 348/207.1 |

FOREIGN PATENT DOCUMENTS

JP 2002-271721 A 9/2002

* cited by examiner

*Primary Examiner*—Sinh Tran
*Assistant Examiner*—Albert H Cutler
(74) *Attorney, Agent, or Firm*—Birch, Stewart, Kolasch & Birch, LLP (57) ABSTRACT

A printer having a digital camera connected thereto checks whether or not a transfer button of the camera is pressed, and checks the communication mode of the camera in the case where it is pressed. In the case where the communication mode of the camera is a mass storage mode, a conversion command for ordering change to a PTP mode is sent to the camera from the printer. The camera performs a bus reset so as to redo configuration and convert the protocol to the PTP mode. In the case where the communication mode of the camera is the PTP mode or is automatically changed to the PTP mode, the image is transferred to the printer in conjunction with operation of the transfer button. Thus, a desired image is transferred to a host such as the printer according to a transfer instruction of an image by the transfer button, etc. on a device side while a user is not conscious of the state of a communication mode and mode switching of the device such as the digital camera.

5 Claims, 5 Drawing Sheets

IMAGE SENDING AND RECEIVING SYSTEM, IMAGE SENDING APPARATUS AND IMAGE RECEIVING APPARATUS

This nonprovisional application claims priority under 35 U.S.C. §119(a) on Patent Application No. 2002-321046 filed in JAPAN on Nov. 5, 2002, the entire contents of which are hereby incorporated by reference.

BACKGROUND OF THE INVENTION

1. Field of the Invention

The present invention relates to an image sending and receiving system, an image sending apparatus and an image receiving apparatus, and in particular, to a technology for automatically switching a communication mode of the image sending apparatus having a plurality of communication modes.

2. Description of the Related Art

When connecting a digital camera to an external device such as a personal computer, there are the cases where the digital camera is recognized as a mass storage device by the external device and the cases where it is recognized thereby as a camera such as a PC camera. Japanese Patent Application Publication No. 2002-271721 discloses that it is switched by an operation mode (a recording mode or a reproduction mode) of the camera or switched by key operation as to which device to be recognized as.

There is a digital camera having a mass storage mode and a Picture Transfer Protocol (PTP) mode as communication modes for communicating with the external device and capable of having these modes selected by a user on a setup menu screen of the camera. In the case of this digital camera, it is recognized as a mass storage device (external recording medium) by the external device if the communication mode thereof is set at the mass storage mode. If set at the PTP mode, it is possible to select an image to be transferred by the camera and press a transfer button provided to the camera so as to send the selected image to the personal computer and so on.

In the case of using a digital print system (DPS) function wherein a digital camera having a mass storage mode and a PTP mode is connected to a printer and a desired image is transferred to the printer by pressing an image transfer button of the camera so as to be print-outputted by the printer, it is necessary to set the communication mode of the camera at the PTP mode by using a setup menu. However, there are problems that there is a high possibility of forgetting to set the communication mode of the camera at the PTP mode or making a mistake when using the DPS function, and that it takes time and effort to switch the communication mode because it must be set by using the setup menu, so that convenience as an original object of the DPS function cannot be implemented.

In the case where the camera itself automatically switches the communication mode to the mass storage mode or a PC camera mode depending on whether an operation state of the camera is a reproduction mode or a recording mode as with an imaging apparatus described in Japanese Patent Application Publication No. 2002-271721, it is possible to omit a device which switches between the mass storage mode and the PC camera mode by using the setup menu of the camera. In this case, however, there are problems that it is necessary to manually switch an operation mode of the camera depending on whether to use the camera in the mass storage mode or in the PC camera mode, and that it is not possible to set the communication mode of the camera at a desired communication mode in the case where the relationship between the operation mode and communication mode of the camera is not grasped.

SUMMARY OF THE INVENTION

The present invention has been implemented in consideration of such circumstances, and its object is to provide an image sending and receiving system, an image sending apparatus and an image receiving apparatus capable of transferring the desired image to a host such as the printer by a transfer instruction of the image by means of a transfer button, etc. on the device side while the user is not conscious of the state of the communication mode and mode switching of the device such as the digital camera.

In order to attain the above-described object, the present invention is directed to an image sending and receiving system, comprising: an image sending apparatus which comprises: an image capturing device which captures an image; a recording device which records the captured image on a recording medium; an image selecting device which selects a desired image of images recorded on the recording medium; a first communication device which has a first communication mode capable of sending an image capturing command to an external device and sending the selected image, and a second communication mode for functioning as an external recording device for the external device; a transfer instruction device which outputs a transfer instruction for transferring the image selected by the image selecting device to the external device through the first communication device; and an automatic mode switching device which automatically switches between the first communication mode and the second communication mode in the first communication device; and an image receiving apparatus which comprises: a second communication device which performs at least communication in the first communication mode with the image sending apparatus; a recording device which records the image received through the second communication device; and a mode switch control device which controls a switch between the communication modes of the image sending apparatus, wherein: on checking that there has been the transfer instruction of the image from the transfer instruction device, the mode switch control device of the image receiving apparatus determines whether or not the communication mode with the image sending apparatus is the first communication mode, and sends a conversion command for ordering change to the first communication mode if determined that a current communication mode of the image sending apparatus is not the first communication mode; and on receiving the conversion command from the image receiving apparatus, the automatic mode switching device of the image sending apparatus switches the communication mode of the first communication device to the first communication mode.

According to the present invention, the image sending and receiving system is comprised of the image sending apparatus and the image receiving apparatus. These apparatuses have the first communication device on the image sending apparatus side and the second communication device on the image receiving apparatus side connected to each other through cables or wireless so as to communicate by a predetermined protocol.

The first communication device on the image sending apparatus side has the first communication mode capable of, if there is the transfer instruction of the image from the transfer instruction device such as the transfer button, sending the image capturing command to the external devices and sending the image and the second communication mode for being recognized as the external recording medium for the external devices and being read and written by the external devices. These communication modes are automatically switched by the automatic mode switching device according to the transfer instruction of the image by the transfer instruction device.

To be more specific, if there is the transfer instruction of the image according to operation of the image transfer instruction device from the image sending apparatus, it is checked that there has been the transfer instruction on the image receiving apparatus side, and it is determined whether or not the communication mode with the image sending apparatus at this time is the first communication mode. If determined that a current communication mode of the image sending apparatus is not the first communication mode, the image receiving apparatus sends the conversion command for ordering change to the first communication mode to the image sending apparatus. On receiving the conversion command from the image receiving apparatus, the automatic mode switching device of the image sending apparatus switches the current communication mode to the first communication mode. To be more specific, the image sending apparatus is bus-set by the image receiving apparatus, has its configuration redone, and converts the protocol so as to be in the first communication mode.

Thus, the image sending apparatus and the image receiving apparatus are capable of data communication in the first communication mode, and the image is captured by the image receiving apparatus according to the transfer instruction of the image from the image sending apparatus side. In the case where the image sending apparatus and the image receiving apparatus are capable of the data communication in the first communication mode when there is the transfer instruction of the image, the automatic switching of the communication modes is not performed, and the image is immediately transferred.

Preferably, the image sending apparatus further comprises a manual mode switching device which switches between the first communication mode and the second communication mode by manual operation; and the mode switching by the automatic mode switching device takes preference over the mode switching by the manual mode switching device.

Preferably, the automatic mode switching device of the image sending apparatus switches the communication mode of the second communication device to the second communication mode in a case where a current communication mode is the first communication mode and it is in a non-connected state after connecting to the external device. According to the present invention, the second communication mode is a standard communication mode, and it automatically switches to the first communication mode if the transfer instruction device is operated.

Preferably, the first communication mode is a PTP mode, and the second communication mode is a mass storage mode.

Preferably, the image sending apparatus is one of a digital camera, a scanner and a copying machine.

Preferably, the image receiving apparatus is one of a printer, a personal computer and a server.

The present invention is also directed to an image sending apparatus, comprising: an image capturing device which captures an image; a recording device which records the captured image on a recording medium; an image selecting device which selects a desired image of images recorded on the recording medium; a communication device which has a first communication mode capable of sending an image capturing command to an external device and sending the selected image, and a second communication mode for functioning as an external recording device for the external device; a transfer instruction device which outputs a transfer instruction for transferring the image selected by the image selecting device to the external device through the communication device; and an automatic mode switching device which automatically switches between the first communication mode and the second communication mode in the communication device, wherein on receiving the conversion command ordering change to the first communication mode from the image receiving apparatus through the communication device, the automatic mode switching device switches the communication mode of the communication device to the first communication mode.

The present invention is also directed to an image receiving apparatus, comprising: a communication device which has a first communication mode capable of, on receiving from an image sending apparatus an image capturing command of a desired image of images recorded on a recording medium in the image sending apparatus, capturing the image according to the received command; a recording device which records the image received through the communication device; and a mode switch control device which switches communication modes of the image sending apparatus, wherein on checking that there has been a transfer instruction from the image sending apparatus through the communication device, the mode switch control device determines whether or not the communication mode with the image sending apparatus is the first communication mode, and sends a conversion command for ordering change to the first communication mode if determined that a current communication mode of the image sending apparatus is not the first communication mode.

To be more specific, these image sending apparatus and image receiving apparatus are the image sending apparatus and the image receiving apparatus constituting the above-described image sending and receiving system.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereafter, preferred embodiments of an image sending and receiving system, an image sending apparatus and an image receiving apparatus according to the present invention will be described in detail by referring to the attached drawings.

Figure 1:
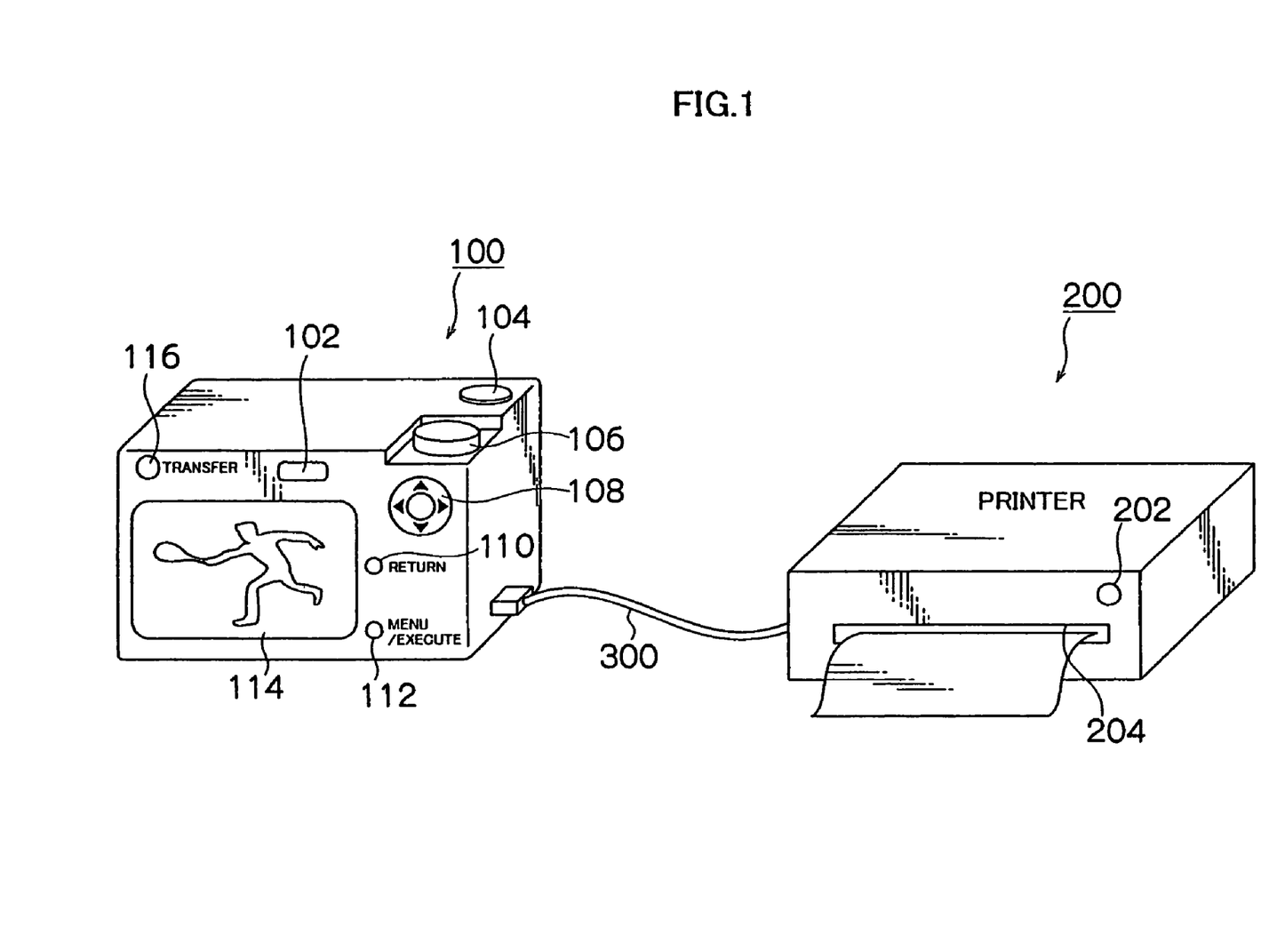
FIG. 1 is an overview diagram showing an image sending and receiving system according to an embodiment of the present invention.

FIG. 1 is an overview diagram showing the image sending and receiving system according to an embodiment of the present invention. The image sending and receiving system shown in FIG. 1 is comprised of a digital camera 100 as a device for sending a shot image and a printer 200 as a host for capturing an image.

The digital camera 100 has a power switch 102, a shutter button 104, a mode dial 106 for setting various modes such as a shooting mode and a reproduction mode, a multifunction right-left and up-down arrow key 108 to be used for frame advance, menu selection, etc. on zoom operation and reproduction, a "Return" button 110 for canceling an operation and returning to a preceding state, a "Menu/Execute" button 112 for displaying a menu screen and executing a menu selected by operating the arrow key 108, a liquid crystal monitor 114, and a transfer button 116 for transferring the selected image to external devices provided thereto.

The printer 200 has a power switch 202, an outlet 204 for putting out a print, and operation buttons (not shown) such as a print start button provided on its front face.

The digital camera 100 and the printer 200 can be connected to each other through a USB cable 300. The digital camera 100 has a DPS function wherein the image is selected and is sent to the printer 200 by pressing the transfer button 116 so as to be print-outputted.

In the case of using the DPS function, a user sets the digital camera 100 at the reproduction mode with the mode dial 106 and displays the image to be printed on the liquid crystal monitor 114 by operating the right-left key of the arrow key 108. Then, the user connects the digital camera 100 to the printer 200 with the USB cable 300, and presses the transfer button 116. The above operation allows a desired image to be printed by the printer 200.

Figure 2:
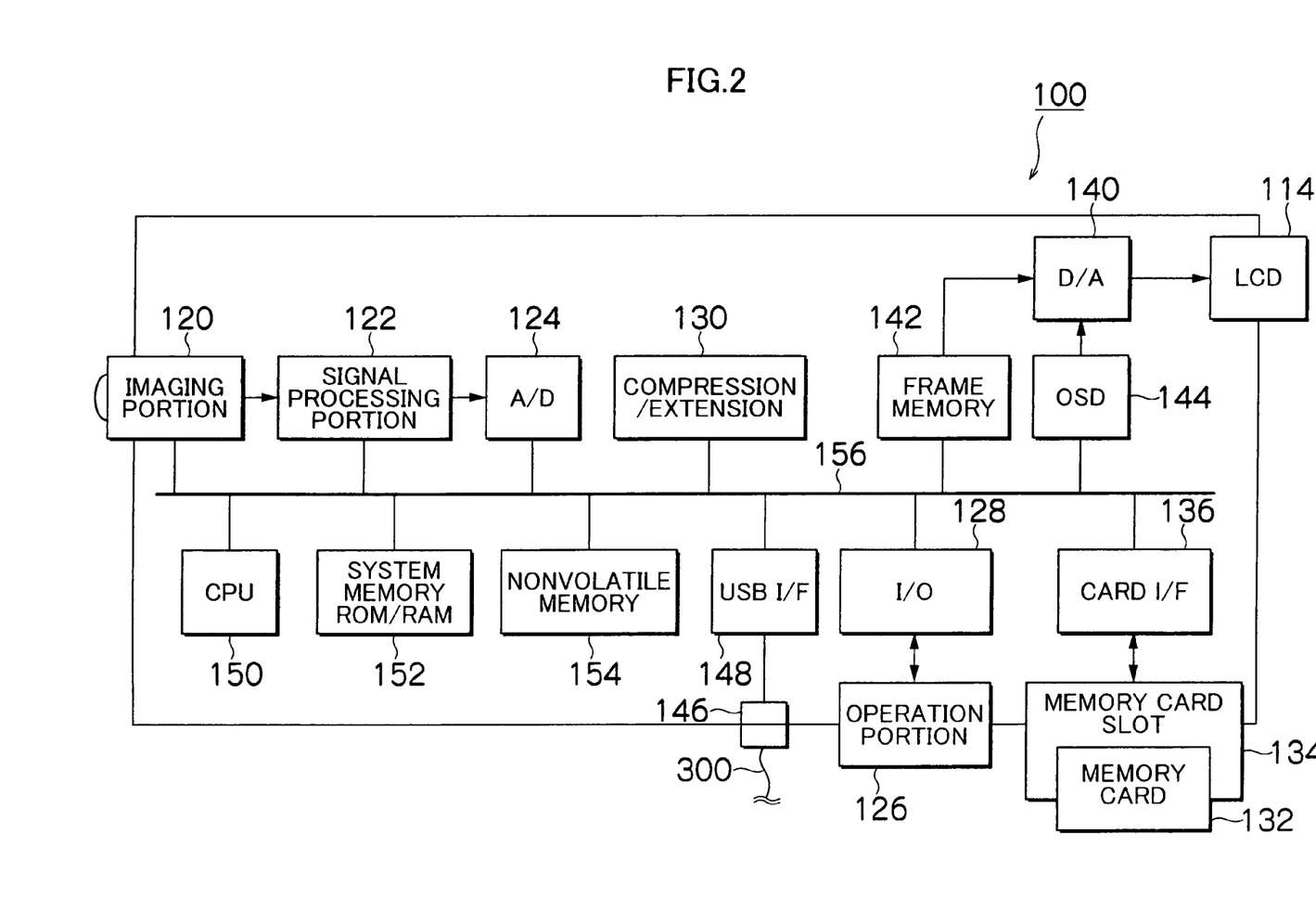
FIG. 2 is a block diagram showing internal configuration of a digital camera shown in FIG. 1.

FIG. 2 is a block diagram showing internal configuration of the digital camera 100.

As shown in FIG. 2, the digital camera 100 comprises, as for an imaging system, an imaging portion 120 for forming an object image on an image receiving surface and photoelectrically transferring it to output it as an image signal, a signal processing portion 122 for performing processes such as a white balance correction and a gamma correction on the image signal, and an A/D converter 124 for converting an analog image signal into digital image data.

As for an input system of the digital camera 100, as shown in FIG. 1, it has an operation portion 126 including the power switch 102, shutter button 104, mode dial 106, arrow key 108, "Return" button 110, "Menu/Execute" button 112, transfer button 116 and so on, and an I/O 128 which is a port for converting signals of each piece of information inputted by the operation portion 126 provided thereto.

As for an image conversion system of the digital camera 100, it has a compression and extension portion 130 for compression-controlling image data by a technique represented by JPEG and controlling extension and development of compressed data, and a card interface 136 for converting data for the sake of recording and reading the image data on a detachable memory card 132 through a card slot 134 provided thereto.

As for a display system of the digital camera 100, it has the liquid crystal monitor 114, a D/A converter 140 for converting the image and so on into a signal to be displayed on the liquid crystal monitor 114, a frame memory 142 comprised of a VRAM and so on for temporarily storing the image and information to be displayed, and an OSD 144 for displaying characters, icons, etc. on the screen provided thereto.

As for communication devices of the digital camera 100, it has a USB connector 146 to be connected to the USB cable 300, and a USB interface 148 for performing two-way communication of the data including the image data with the external devices connected through the USB connector 146 provided thereto. Once USB-connected to the external devices, the digital camera 100 automatically enters a communication mode. As for this communication mode, it has a mass storage mode for having the digital camera 100 recognized as a mass storage device by the external devices and reading and writing the image from the external devices to the memory card 132, and a Picture Transfer Protocol (PTP) mode capable of selecting the image to be transferred on the camera side and sending the selected image to a host such as the printer 200 by pressing the transfer button 116. These communication modes are automatically switched, and the details thereof will be described later.

As for a control portion of the digital camera 100, it has a central processing unit (CPU) 150 for controlling the entire digital camera and exerting control such as sampling control of the image signal, recording control of the image, communication control and display control, a system memory 152 comprised of a ROM in which an operation program and constants are stored and a RAM being a working area on execution of the program and capable of storing the image, and a nonvolatile memory 154 for storing various constants and information as to the operation of the digital camera 100 provided thereto.

Figure 3:
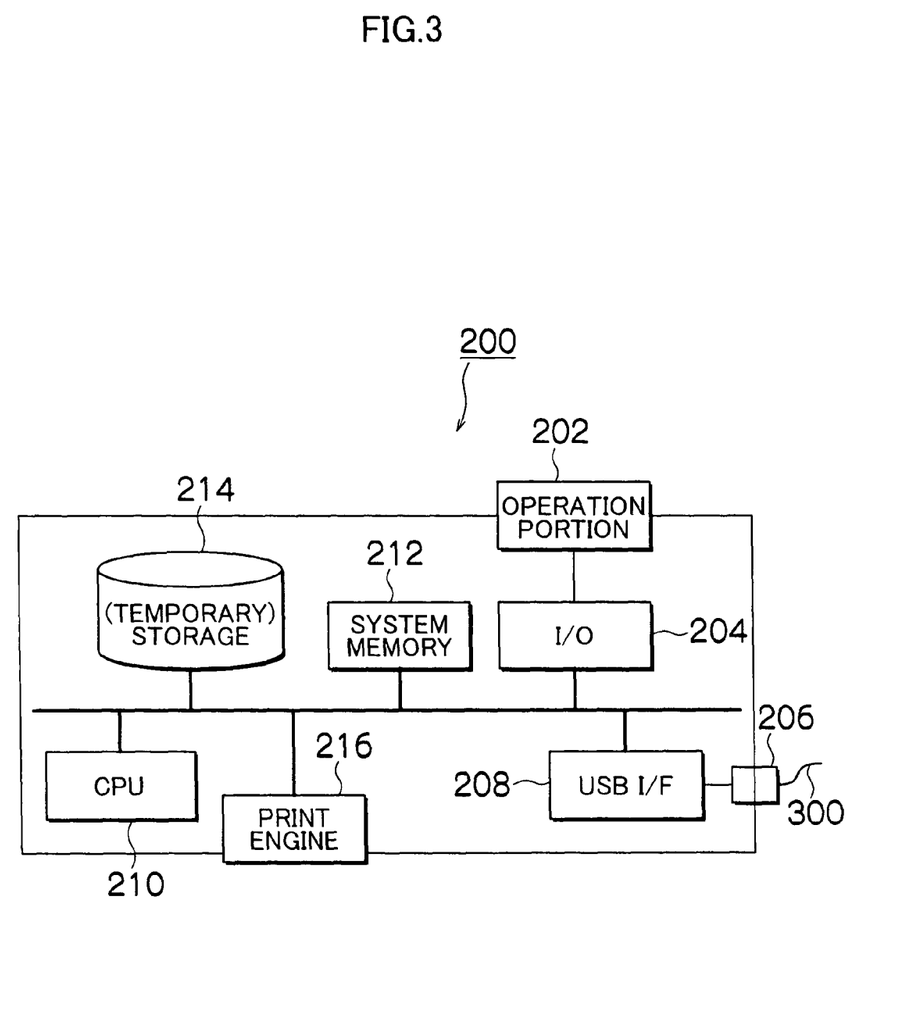
FIG. 3 is a block diagram showing the internal configuration of a printer shown in FIG. 1.

FIG. 3 is a block diagram showing the internal configuration of the printer 200.

As shown in FIG. 3, the printer 200 is comprised of an operation potion 202 including the power switch and so on, an I/O 204 which is a port for converting the signals inputted in the operation potion 202, a USB connector 206 and a USB interface 208 for performing the data communication with the digital camera 100 through the USB cable 300, a CPU 210 for exerting overall control over the portions of the printer 200, a system memory 212 including a ROM to which the program for operating the CPU 210 and various constants and so on are written and a RAM which becomes a work area when the CPU 210 executes processing, a storage portion 214 for temporarily storing received image data, and a print engine 216.

The printer 200 has the PTP mode set up as the communication mode, and outputs a command for changing to the PTP mode under certain conditions to the devices such as the digital camera 100 connected in a mode other than the PTP mode.

Next, a description will be given by referring to flowcharts in FIGS. 4 and 5 as to the case where the digital camera 100 is connected to the printer 200, and the image data is transferred from the digital camera 100 to the printer 200 to print the image.

First, the digital camera 100 is connected to the printer 200 with the USB cable 300, and the printer 200 checks whether or not the transfer button 116 (refer to FIG. 1) is pressed (step S10). In the case where the transfer button 116 is pressed, the printer 200 checks the communication mode of the digital camera 100 (step S12).

The digital camera 100 can have the PTP mode and mass storage mode (MS mode) switched in a setup menu by the user. To be more specific, the "Menu/Execute" button 112 is pressed to show the menu screen on the liquid crystal monitor 114, where the setup menu is selected by operating the arrow key 108, "PTP" or "Card reader" (MS mode) of USB communication items is further selected, and the "Menu/Execute" button 112 is pressed again so as to select a desired communication mode.

In the case where the communication mode of the digital camera 100 is the MS mode, the printer 200 sends to the digital camera 100 the command for changing the communication mode to the PTP mode (step S14). Therefore, if the transfer button 116 is pressed after connecting the digital camera 100 to the printer 200, the printer 200 detects a transfer instruction of the image in conjunction with the operation of the transfer button 116 and sends to the digital camera 100 the conversion command for changing the communication mode to the PTP mode.

On receiving the conversion command from the printer 200, the digital camera 100 performs a bus reset so as to redo the configuration of the communication mode and convert the protocol to switch from the MS mode to the PTP mode (steps S16, 18 and 20). Thus, the communication mode of the digital camera 100 is automatically changed from the manually set MS mode to the PTP mode in conjunction with the operation of the transfer button 116.

Once the communication mode of the digital camera 100 is switched to the PTP mode by the protocol conversion in the step S20, the printer 200 checks that the communication mode of the digital camera 100 is now the PTP mode in the step S12, and the data communication with the digital camera 100 in the PTP mode becomes possible thereafter.

To be more specific, the digital camera 100 is set at the reproduction mode with the mode dial 106, and the image to be printed is displayed on the liquid crystal monitor 114 by operating the right-left key of the arrow key 108. If a USB connection between the digital camera 100 and the printer 200 is made and the transfer button 116 is operated thereafter, the image data of the selected image is transferred from the digital camera 100 to the printer 200 (step S22). To be more precise, a file name of the image selected by the digital camera 100 is sent to the printer 200, and of the image files stored in the memory card 132 of the digital camera 100 according to received file names, the printer 200 reads the image file corresponding to the received file name.

Once the printer 200 finishes capturing the image data from the digital camera 100 to the storage portion 214 in conjunction with the operation of the transfer button 116, it generates the data for printing from the image data temporarily stored in the storage portion 214 automatically or according to the operation of the print start button (not shown) so as to output it to the print engine 216. The print engine 216 prints the image on printing paper according to the data for printing thus inputted.

The digital camera 100 checks whether or not the bus reset has occurred (step S24), and in the case where the bus reset has occurred, it means that the USB cable 300 is removed so that the communication mode of the camera is released. It goes without saying that the bus reset checked in the step S24 is different from the bus reset in the step S16 which is performed to switch the communication mode.

If determined that the bus reset has not occurred in the step S24, the printer 200 determines whether or not the transfer button 116 has been pressed again (step S26). In the case where the transfer button 116 has not been pressed, it returns to the step S24 to check whether or not the bus reset has occurred. In the case where the transfer button 116 has been pressed, it returns to the step S22 to transfer the data for printing again. To be more specific, once the communication mode of the digital camera 100 is set at the PTP mode by operating the transfer button 116, the PTP mode is maintained until the USB cable 300 is removed. While in the PTP mode, the image to be printed is displayed on the liquid crystal monitor 114 by operating the right-left key of the arrow key 108 to select the image. Then, the transfer button 116 is pressed thereafter so that the image data of the selected image is transferred to the printer 200.

Thus, the communication mode of the digital camera 100 is automatically switched from the MS mode to the PTP mode by pressing the transfer button 116 so as to transfer the image selected for printing to the printer 200. When pressing the transfer button 116, the user can use the DPS function without having to be conscious of the communication mode of the camera (that is, without performing a troublesome mode switching operation).

Next, the case of connecting the digital camera 100 to a personal computer (personal computer only supporting mass storage) will be described.

Figure 4:
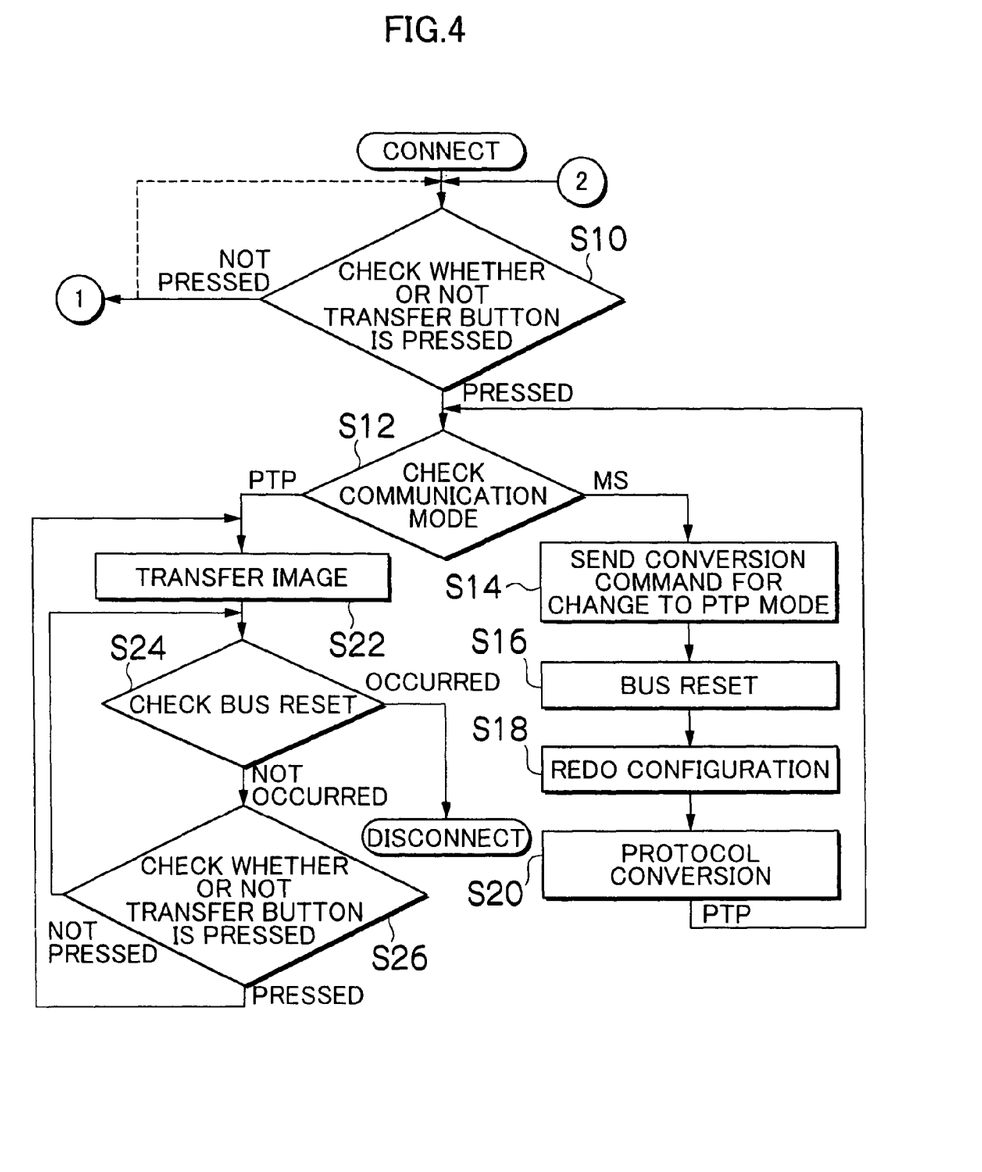
FIG. 4 is a flowchart used to describe operation according to the embodiment of the present invention.
Figure 5:
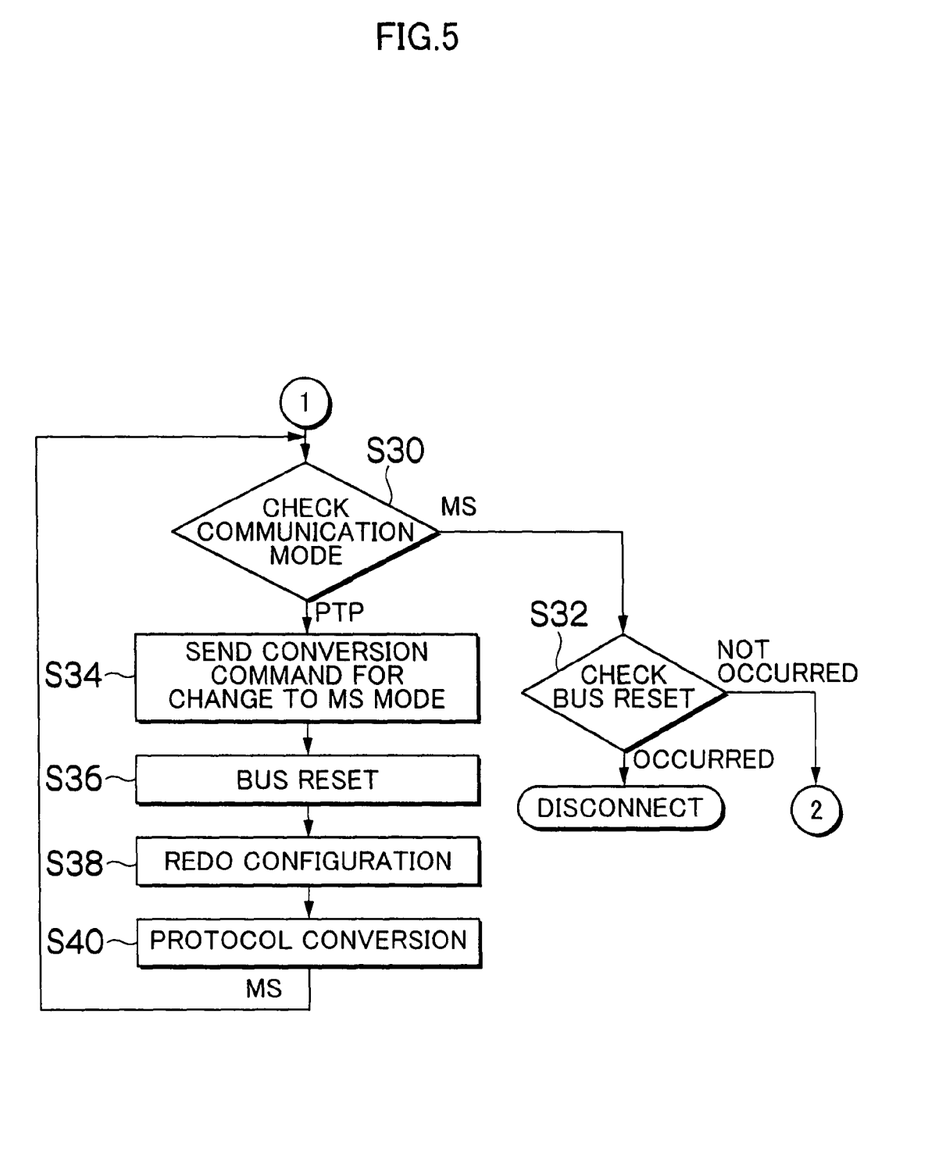
FIG. 5 is a flowchart used to describe the operation according to the embodiment of the present invention.

In this case, the transfer button 116 of the digital camera 100 is not pressed, so that it is determined that the transfer button 116 has not been pressed in the step S10, and it moves on to a step S30 shown in FIG. 5. In the step S30, the personal computer checks whether the communication mode is the PTP mode or MS mode. In the case where the communication mode is set at the MS mode in advance, it checks whether or not the bus reset has occurred (step S32), and in the case where the bus reset has occurred, it means that the USB cable 300 is removed so that the communication mode of the camera is released.

If determined that the bus reset has not occurred in the step S32, it returns to the step S10 in FIG. 4. In the step S10, it is determined whether or not the transfer button 116 has been pressed by the personal computer. To be more specific, in the case where the communication mode is set at the MS mode in advance and neither the transfer button 116 is pressed nor the bus reset occurs thereafter, the MS mode is maintained.

In the case where, in the step 30, the communication mode is set at the PTP mode in advance and the transfer button 116 has not been pressed thereafter, it moves on to a step S34. In the step S34, the personal computer sends to the digital camera 100 the conversion command for changing the communication mode to the MS mode. Therefore, in the case where the transfer button 116 is not pressed after connecting the digital camera 100 to the personal computer in the PTP mode, the personal computer sends to the digital camera 100 the conversion command for changing the communication mode to the MS mode.

On receiving the conversion command from the personal computer, the digital camera 100 performs the bus reset, redoes the configuration of the communication mode, and converts the protocol to switch from the PTP mode to the MS mode (steps S36, 38 and 40). Thus, the communication mode of the digital camera 100 is automatically changed from the manually set PTP mode to the MS mode.

Once the communication mode of the digital camera 100 is switched to the MS mode by the protocol conversion in the step S40, the digital camera 100 is recognized as a drive by an operation system (OS) of the personal computer as with a floppy disk drive and a hard disk drive so that it becomes possible to read from and write to it with viewer software, Explorer and so on attached to the digital camera 100.

According to this embodiment, it is possible to manually switch between the PTP mode and the MS mode. However, it is not limited thereto, and it is also possible to have the MS mode set up by default and have the communication mode automatically switched in conjunction with the operation of the transfer button 116 thereafter. In this case, if the transfer button 10 is not pressed in the step 10 of the flowchart shown in FIG. 4, it returns as shown by a broken line so that the MS mode is maintained.

An OS of the personal computer in recent years supports both the PTP mode and the MS mode. As for the digital camera 100 in this case, it is preferable to be capable of manually switching between the PTP mode and the MS mode. If the transfer button 116 is not pressed, it is desirable to return as shown by broken lines in the step 10 of the flowchart in FIG. 4 so as to maintain the mode which is manually set up.

Furthermore, as for the image sending apparatus according to the present invention, it is not limited to the digital camera but it may be applicable to other devices such as a scanner and a copying machine as long as they are the ones capable of capturing and recording the image. As for the image receiving apparatus according to the present invention, it may be applicable to a server and so on in addition to the printer and personal computer.

Furthermore, as for a communication interface, not only the USB but IEEE1394 and so on are also applicable. It is not limited to the connection with cables but may also be a wireless communication interface.

As described above, it is possible, according to the present invention, to automatically switch to a corresponding communication mode according to the transfer instruction of the image by the transfer button, etc. on the device side such as the digital camera. It is thereby possible to transfer the desired image to the host such as the printer while the user is not conscious of the state of the communication mode and mode switching of the device so as to reduce the burden of the mode switching on the user.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image sending and receiving system, comprising:
   an image sending apparatus which comprises:
   an image which captures an image;
   a recording device which records the captured image on a recording medium;
   an image selecting device which selects a desired image of images recorded on the recording medium;
      a first communication device which has a first communication mode for sending an image capturing command to an external device and sending the image selected by the image selecting device to the external device, and
      a second communication mode for enabling the image sending apparatus to function as an external recording device for the external device and to be read and written by the external device;
   a transfer instruction device which outputs a transfer instruction for transferring the image selected by the image selecting device to the external device through the first communication device; and
   an automatic mode switching device which automatically switches between the first communication mode and the second communication mode in the first communication device upon receipt of an order from the external device; and
   the external device includes an image receiving apparatus which comprises:
      a second communication device which performs at least communication in the first communication mode with the image sending apparatus;
      a recording device which records the image received through the second communication device; and
      a mode switch control device which orders the image sending apparatus to control a switch between the first communication mode and the second communication mode of the image sending apparatus, wherein:
   on checking that there has been the transfer instruction of the image from the transfer instruction device of the image sending apparatus, the mode switch control device of the image receiving apparatus determines whether or not the communication mode with the image sending apparatus is the first communication mode, and sends a conversion command ordering change to the first communication mode if determined that a current communication mode of the image sending apparatus is not the first communication mode; and
   on receiving the conversion command from the image receiving apparatus, the automatic mode switching device of the image sending apparatus switches the communication mode of the first communication device to the first communication mode, wherein the first communication mode is a PTP mode, and the second communication mode is a mass storage mode.

2. The image sending and receiving system as defined in claim 1, wherein:
   the image sending apparatus further comprises a manual mode switching device which switches between the first communication mode and the second communication mode by manual operation; and
   the mode switching by the automatic mode switching device takes preference over the mode switching by the manual mode switching device.

3. The image sending and receiving system as defined in claim 1, wherein the automatic mode switching device of the image sending apparatus switches the communication mode of the first communication device to the second communication mode in a case where an initial communication mode was the second communication mode and a current communication mode is the first communication mode and it is in a non-connected state after connecting to the external device.

4. The image sending and receiving system as defined in claim 1, wherein the image sending apparatus is one of a digital camera, a scanner and a copying machine.

5. The image sending and receiving system as defined in claim 1, wherein the image receiving apparatus is one of a printer, a personal computer and a server.

* * * * *